US010473795B2

(12) United States Patent
Wang et al.

(10) Patent No.: US 10,473,795 B2
(45) Date of Patent: Nov. 12, 2019

(54) LARGE-AREA X-RAY GAS DETECTOR

(71) Applicant: Nuctech Company Limited, Beijing (CN)

(72) Inventors: Yongqiang Wang, Beijing (CN); Qingjun Zhang, Beijing (CN); Yuanjing Li, Beijing (CN); Ziran Zhao, Beijing (CN); Lifeng Sun, Beijing (CN); Nan Bai, Beijing (CN); Xingliang Zhai, Beijing (CN)

(73) Assignee: NUCTECH COMPANY LIMITED, Beijing (CN)

(*) Notice: Subject to any disclaimer, the term of this patent is extended or adjusted under 35 U.S.C. 154(b) by 0 days.

(21) Appl. No.: 16/026,106

(22) Filed: Jul. 3, 2018

(65) Prior Publication Data

US 2019/0004185 A1 Jan. 3, 2019

(30) Foreign Application Priority Data

Jul. 3, 2017 (CN) .......................... 2017 1 0534517

(51) Int. Cl.
G01T 1/185 (2006.01)
G01T 3/00 (2006.01)
G01V 5/00 (2006.01)

(52) U.S. Cl.
CPC .............. *G01T 1/185* (2013.01); *G01T 3/008* (2013.01); *G01V 5/0025* (2013.01)

(58) Field of Classification Search
CPC ........ G01T 1/185; G01T 3/008; G01V 5/0025
See application file for complete search history.

(56) References Cited

U.S. PATENT DOCUMENTS 4,047,040 A * 9/1977 Houston ................ H01J 47/02
250/385.1
4,047,041 A * 9/1977 Houston ................ H01J 47/02
250/385.1

(Continued)

FOREIGN PATENT DOCUMENTS

WO 02/25313 A1 3/2002
WO 2006/103403 A1 10/2006

(Continued)

OTHER PUBLICATIONS

Extended European Search Report dated Nov. 15, 2018 received in European Patent Application No. 18 18 1515.0.

*Primary Examiner* — Marcus H Taningco
(74) *Attorney, Agent, or Firm* — Scully, Scott, Murphy & Presser, P.C.

(57) ABSTRACT

A large-area X-ray gas detector includes a housing having an inner cavity and a ray entrance communicated with the inner cavity, a thin entrance window and a signal collection module. The inner cavity is filled with a working gas which is a non-electronegativity gas sensitive to the X-ray. The entrance window is hermetically connected to the ray entrance such that the X-ray enters into the inner cavity. The signal collection module comprises an anode wire electrode layer and a cathode electrode layer arranged parallel with each other in the inner cavity, in which the anode wire electrode layer has an anode wire for accessing to a high voltage, and the cathode electrode layer is grounded. The anode wire electrode layer collects electrons generated by the working gas under an action of the X-ray.

19 Claims, 4 Drawing Sheets

(56) References Cited

U.S. PATENT DOCUMENTS

| | | | | |
|---|---|---|---|---|
| 4,193,000 A | * | 3/1980 | Shirayama | H01J 47/02 |
| | | | | 250/385.1 |
| 5,192,861 A | * | 3/1993 | Breskin | H01J 47/02 |
| | | | | 250/214 VT |
| 5,434,468 A | | 7/1995 | Jeavons | |
| 2008/0272307 A1 | * | 11/2008 | Helsby | G01T 1/185 |
| | | | | 250/389 |
| 2010/0258737 A1 | | 10/2010 | McCormick et al. | |
| 2012/0199752 A1 | * | 8/2012 | Desaute | G01T 1/185 |
| | | | | 250/382 |
| 2012/0217406 A1 | * | 8/2012 | McGregor | G01T 3/00 |
| | | | | 250/361 R |

FOREIGN PATENT DOCUMENTS

| | | | |
|---|---|---|---|
| WO | 2011/025853 | A1 | 3/2011 |
| WO | 2011/045411 | A1 | 4/2011 |
| WO | 2011/138631 | A1 | 11/2011 |

\* cited by examiner

LARGE-AREA X-RAY GAS DETECTOR

CROSS REFERENCE

This application is based upon and claims priority to Chinese Patent Application No. 201710534517.2, filed on Jul. 3, 2017, the entire contents thereof are incorporated herein by reference.

TECHNICAL FIELD

The present disclose relates to a radiation detection apparatus, particularly to a large-area X-ray gas detector apparatus for radiation detection.

BACKGROUND

X-ray backscatter imaging technique is one of primary technologies in a security inspection field, such as a human body and a vehicle. By X-ray scanning the human body and the vehicle, etc., backscattered signals of the X-ray are received by using a large-area ray detector, and through data collection and image processing, the backscattered images of a scattered object may be obtained.

In a backscatter security inspection technique, performance indications of the backscatter detector apparatus are directly related to an image quality and a detection rate of an object to be detected.

A detector structure having a large-area entrance window capable of receiving X-rays and a higher detection efficiency is a critical request of a detector for backscatter detection. In addition, a technical means of the backscatter imaging technique in a flying spot manner is used currently, which determines that the detector should use an integral mode, the X-ray signal may be converted to detectable electrical signals, and a conversion time should be as short as possible, generally within several microseconds.

At present, the common detectors that may be used for large-area ray detection include gas detectors, semiconductor detectors, and combined detectors formed by scintillators and various photomultipliers.

The gas detectors mainly include an ionization chamber, a proportional tube, and a G-M count tube which work in different amplification regions. Since Charpark invented a multi-wire proportional chamber and a micro-strip gas detector (MSGC), various proportional forms based on micro-strips, microfilaments, micro-pores and micro-webs and a lot of variant structures of the gas detectors come out. Because the position resolution and the counting rate of such gas detectors are greatly improved, they are readily used for scientific research. However, an incidence depth of the rays permitted by most of the gas detectors in a new form of a high position accuracy in the market is not enough, generally between a few millimeters and a few centimeters. When number and position of photons of the incident rays are correctly given, the total energy and dose of incident rays cannot accurately reflected. Most photons have limited energy deposition, and thereby having a lower detection efficiency. In addition, semiconductor detectors are widely used for ray detection, however, there still exits such problems that the detector has a smaller sensitive area and the environmental stability needs to be improved. In addition, the combined detector formed of a scintillator(s) and a photomultiplier(s) is used for the large-area ray detection, but its light collection conversion effect is lower and its cost is higher.

The above information disclosed in this BACKGROUND section is only for enhanced understanding of the background of the disclosure and therefore it may contain information that does not constitute the relevant technology known to those skilled in the art.

SUMMARY

According to one aspect of the present disclosure, a large-area X-ray gas detector includes a housing, an entrance window of thin type and a signal collection module. The housing has an inner cavity and a ray entrance, in which the ray entrance is communicated with the inner cavity, the inner cavity is filled with a working gas, and the working gas is a non-electronegativity gas sensitive to the X-ray. The entrance window is hermetically connected to the ray entrance such that the X-ray enters into the inner cavity. The signal collection module includes an anode wire electrode layer and a cathode electrode layer arranged parallel with each other in the inner cavity. The anode wire electrode layer has an anode wire for accessing to a high voltage, and the cathode electrode layer is grounded. The anode wire electrode layer collects electrons generated by the working gas under an action of the X-ray.

According to one embodiment of the present disclosure, each of the anode wire electrode layers and the cathode electrode layers is provided in a multiple layer, the multiple layers of the anode wire electrode layers and the cathode electrode layers are arranged at a distance and superimposed with each other, and the anode wire electrode layers are connected in parallel with each other, and the cathode electrode layers are connected in parallel with each other.

According to one embodiment of the present disclosure, each of the anode wire electrode layer and the cathode edge electrode layer is provided in one layer; a screen gate electrode layer is further provided between the anode wire electrode layer and the cathode electrode layer; a voltage value of the screen gate electrode layer is between a voltage value of the anode wire electrode layer and a voltage value of the cathode electrode layer.

According to one embodiment of the present disclosure, the screen gate electrode layer includes a metal wire mesh or a hollow metal plate.

According to one embodiment of the present disclosure, the anode wire electrode layer further includes an anode frame, and a plurality of insulating pillars are disposed on frames of the opposite sides of the anode frame; the anode wire is serpentinely wrapped around a plurality of the insulating pillars, and both ends of the anode wire are fixedly connected to the anode frame by a fixing assembly.

According to one embodiment of the present disclosure, the cathode electrode layer includes an ultra-thin circuit board having a conductive layer on the surface thereof.

According to one embodiment of the present disclosure, the conductive layer is a "well"-shaped copper wire layer that completely covers front and back surfaces of the ultra-thin circuit board.

According to one embodiment of the present disclosure, the cathode electrode layer includes a metal wire mesh or a hollow metal plate.

According to one embodiment of the present disclosure, the anode wire electrode layer and the cathode electrode layer are parallel with an incident direction of the X-ray.

According to one embodiment of the present disclosure, the anode wire electrode layer and the cathode electrode layer are perpendicular to an incident direction of the X-ray.

According to one embodiment of the present disclosure, the working gas is an inert gas, a polyatomic molecular gas, or a mixture of the inert gas and the polyatomic molecular gas.

According to one embodiment of the present disclosure, the housing is further provided with a bottom plate opposite to an entrance position of the ray entrance, and the bottom plate is detachably and hermetically connected to the housing, and encloses the inner cavity together with the entrance window.

According to one embodiment of the present disclosure, an air pressure of the working gas is greater than or equal to 1 atmospheric pressure.

According to one embodiment of the present disclosure, the entrance window is one of a circuit board, a metal thin film structure, or a non-metal thin film structure.

According to one embodiment of the present disclosure, both sides of the cathode electrode layer are evenly coated with neutron-sensitive materials.

In the large-area X-ray gas detector of the present invention, the signal collecting module includes an anode wire electrode layer and a cathode electrode layer disposed parallel with each other in the inner cavity. The anode wire electrode layer may collect electrons in the inner cavity. Therefore, the total energy and dose of the X-rays entering the entry window may be efficiently detected, and the detection area is large, the charge collection speed is fast, the structure is simple, the manufacture is convenient, and the cost is low.

According to the aforesaid technical solutions, the advantages and positive effects of the present disclosure are as follows:

BRIEF DESCRIPTION OF THE DRAWINGS

The foregoing and other features and advantages of this disclosure will become more apparent from the illustrative embodiments as described in details when taken in conjunction with the accompanying drawings.

DETAILED DESCRIPTION

Now, the exemplary embodiments will be described more fully with reference to the accompany drawings. However, the exemplary embodiments may be implemented in various forms and should not be construed as limited to the embodiments set forth herein. Instead, these embodiments are provided so that this disclosure will be thorough and complete, and the concept of the exemplary embodiment will fully conveyed to those skilled in the art. Same reference signs denote the same or similar structures in the accompany drawings, and thus the detailed description thereof will be omitted.

Figure 1:
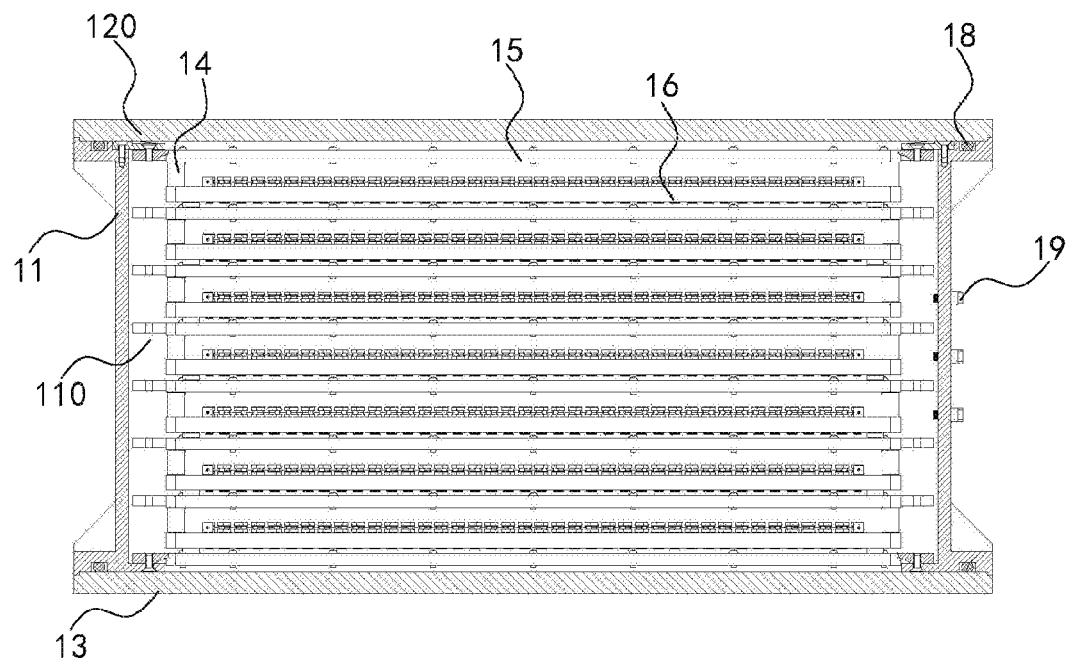
FIG. 1 is a schematic sectional view of a large-area X-ray gas detector according to one embodiment of the present disclosure.
Figure 2:
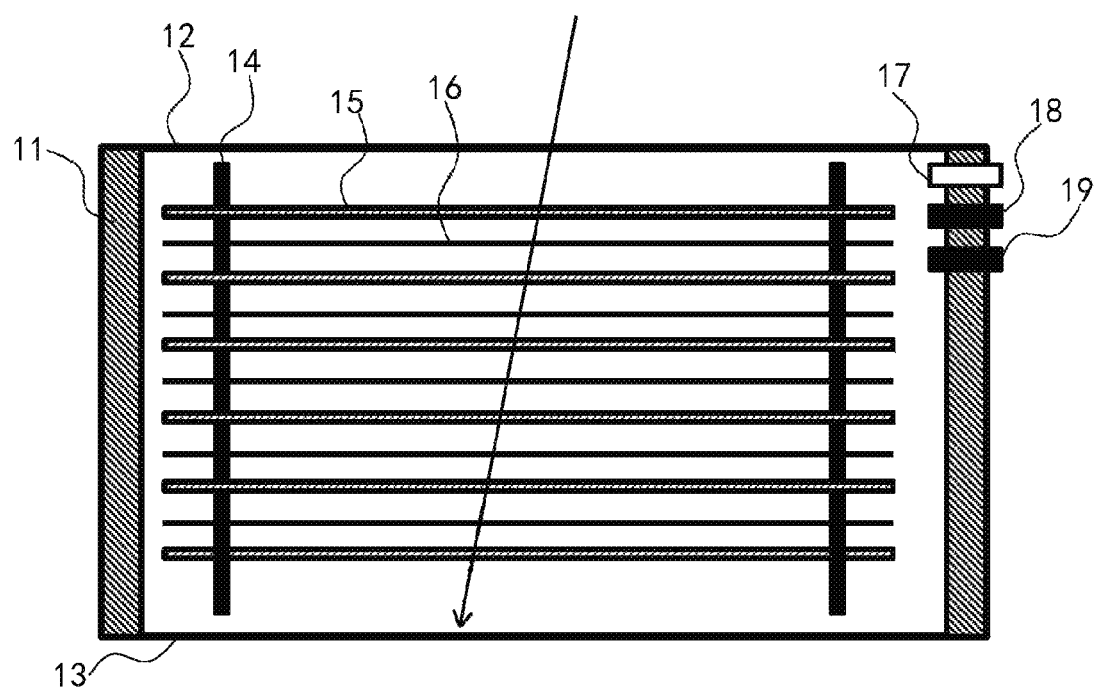
FIG. 2 is a schematic structural view of a large-area X-ray gas detector as shown in FIG. 1.
Figure 5:
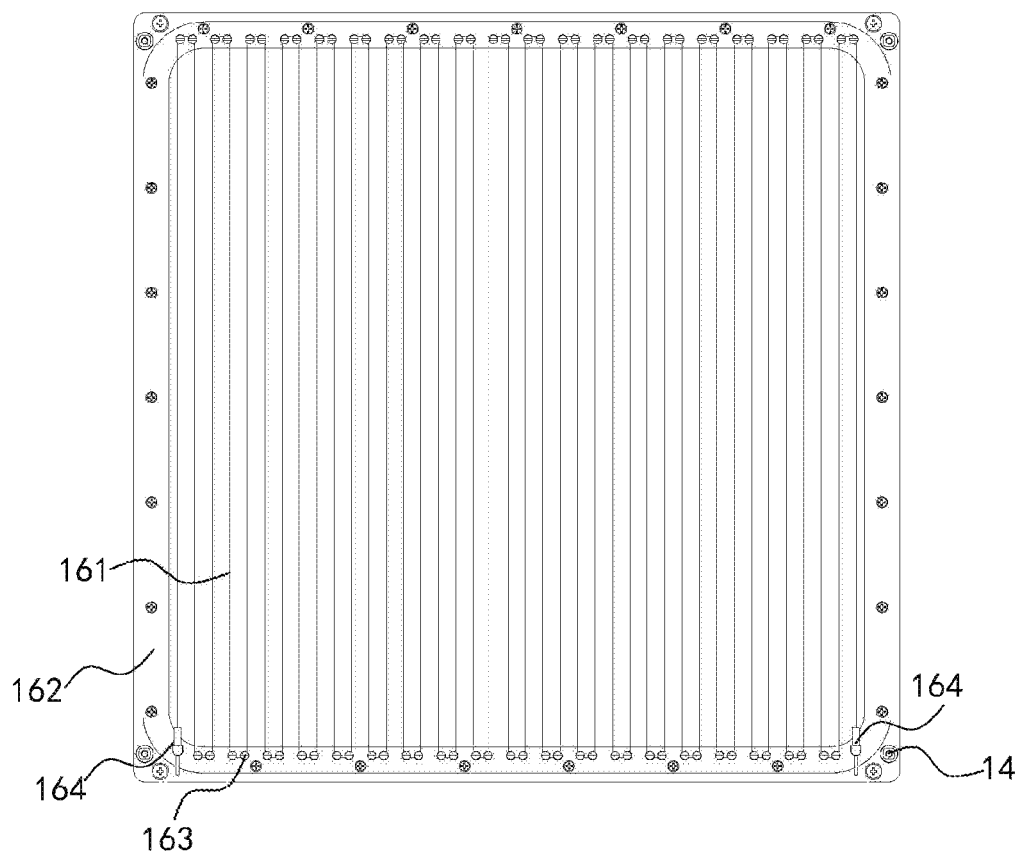
FIG. 5 is a schematic view of the anode wire electrode layer in FIG. 1.

Referring to FIG. 1, FIG. 2 and FIG. 5, an embodiment of the present disclosure discloses a large-area X-ray gas detector. The detector may be used in an X-ray backscatter imaging device to perform security inspections at subway stations, airports and other places. In this embodiment, the large-area X-ray gas detector includes a housing 11, an entrance window 12, and a signal collection module.

The housing 11 serves as a main external support structure of the detector. The housing 11 may be made of metal materials such as aluminum, copper, or iron, or may be made of non-metal materials that have sufficient strength and are coated by a conductive coating layer on the inside thereof. The housing 11 has an inner cavity 110 in the interior thereof. The housing 11 has a ray entrance. The ray entrance is connected to the inner cavity such that the X-rays may enter into the inner cavity 110. The inner cavity 110 is filled with a working gas that is a non-electronegativity gas sensitive to the X-ray. The working gas may be, for example, an inert gas, a polyatomic molecular gas, or a mixture of the inert gas and the polyatomic molecular gas. An air pressure of the working gas may preferably be larger than or equal to 1 atmospheric pressure. Wherein the inert gas may be a high-purity gas such as helium, neon, argon, helium, xenon or a mixture thereof. The polyatomic molecular gas includes carbon dioxide, alkanes, and carbon tetrafluoride. A small amount of polyatomic molecular gases may absorb excess ultraviolet photons to prevent uncontrolled electron proliferation.

The housing 11 may be a cylinder or a cube. In this embodiment, the housing 11 is a cube, and a length×a width×a height of the inner cavity are 40 cm×40 cm×25 cm, respectively. Corresponding reinforcing ribs are also provided on an outer wall of the housing 11 to increase the overall strength. In order to increase detection efficiency, the higher the atomic number of the inert gas, the higher its ability to intercept rays. Specifically, in this embodiment, the working gas is a mixture of high-purity 95% helium and high-purity 5% carbon dioxide gas. The atmospheric pressure of the working gas is 1 atmospheric pressure. Since the inner cavity of the housing 11 has a height of 25 cm, the working gas in the inner cavity also has a height of 25 cm. According to this embodiment, it may be intended to achieve optimization of the cost while satisfying the detection efficiency by adjusting the thickness of the working gas and filling the inert gas of different proportions. Corresponding to backscattered X-ray generated by 225 kev X-ray machine, the detection efficiency may reach 31%. If the structural safety is satisfied, the air pressure of the working gas is appropriately increased, and furthermore the detection efficiency may be improved. Various auxiliary ports such as an intake/exhaust port 17, a high voltage interface 18, and a signal interface 19 may be provided on the housing 11, so that the working gas or various wires may enter into the interior of the housing 11 from the outside thereof.

The entrance window 12 is of a thin film type, which enables the X-rays to enter the inner cavity 110, and also avoid the gas from escaping out of the inner cavity 110. Therefore, the entrance window 12 is made of materials as thin as possible. The entrance window 12 may be one of a circuit board, a metal thin film structure, or a non-metallic thin film structure. For example, the entrance window 12 may be made of a thin circuit board that has a conductive layer on its surface, such as FR-4 or a circuit board of ceramic materials, or may be made of a flexible thin film coated with the conductive layer, such as an ETFE film or a Mylar film. In this embodiment, the entrance window 12 is made of an ETFE film of 250 micron. The entrance window 12 is hermetically connected to the ray entrance of the housing 11 so as to avoid leakage of the working gas. The way of hermetically connecting the entrance window 12 to the housing 11 is not limited as long as the sealing requirement is satisfied.

In this embodiment, as shown in FIG. 1, the entrance window 12 is fixed on a hollow entrance window frame 120. An annular groove is provided at the ray entrance of the housing 11, and the entrance window frame 120 is matched with the groove of the housing 11 through the sealing ring 111, such that a sealing effect may be achieved. And then the entrance window frame 120 is fixed to the housing 11 by fasteners such as screws. An area of the entrance window 12 is generally greater than 500 square centimeters, and may be easily greater than or equal to 1000 square centimeters. That is to say, the detector of the present disclosure may very easily satisfy for an X-ray receiving area of over 1000 square centimeters. As long as the work site permits, the area of the entrance window 12 may further expanded to enhance the X-ray detection effect.

The signal collection module is used to receive electrons and ions excited by the X-rays and output electrical signals to the outside. The signal collection module includes an anode wire electrode layer 16 and a cathode electrode layer 15 disposed parallel with each other in the inner cavity 110. Each of the anode wire electrode layer 16 and the cathode electrode layer 15 is a substantially flat plate-like structure that may conduct electricity. Referring to FIG. 5, in this embodiment, the anode wire electrode layer 16 includes an anode wire 161 and an anode frame 162. The anode frame 162 is a hollow rectangle. A plurality of insulating pillars 163 is disposed on the frames of the opposite sides of the anode frame 162. The anode wire 161 is serpentinely wound on the insulating pillars 163. The wound anode wires 161 are parallel with each other and spaced apart from each other for about 1 cm. The anode wire 161 may also consist of a plurality of small anode wires which are connected in parallel with form a complete anode wire.

The anode wire 161 may preferably use a resistance wire or a gold-plated tungsten wire with a diameter of 50 μm or less. In this embodiment, the anode wire 161 is gold-plated tungsten wire with a diameter of 30 micrometers. The anode wire 161 has a structure of a whole wire including a middle portion wound on the insulating pillar 163, and two ends fixedly connected to the anode frame 162 through the fixing assembly 164. The fixing assembly may be a spring wire fixing assembly, but not limited thereto.

In this embodiment, the cathode electrode layer 15 includes an ultra-thin circuit board having a conductive layer on its surface. The ultra-thin circuit board may be as thin as possible, generally having a thickness of 0.3 mm. The conductive layer may be a complete continuous planar conductive structure, or may be a "well"-shaped copper wire layer that covers the front and back sides of the ultra-thin circuit board. The copper wire has a width of 0.1 mm, a grid width of 1 mm, and a height of 18 microns. In other embodiments of the present disclosure, the cathode electrode layer 15 may also include a metal wire mesh or an etched hollow metal plate.

The anode wire 161 is connected to a high voltage reaching to 20000 volts, while the cathode electrode layer is grounded. The X-rays enter into the inner cavity 110 from the entrance window 12 to interact with the working gas. Such interaction mainly includes a photoelectric effect, a Compton scattering, or generation of positive and negative electron pairs, and finally a large amount of electron ion pairs are generated. Upon the voltage between the anode wire electrode layer 16 and the cathode electrode layer 15, the generated electrons drift towards the anode wire electrode layer 16, and the ions drift towards the cathode electrode layer 15. The charges generated by induction are collected by the anode wire, amplified and transmitted to subsequent electronic systems for further processing.

It is required according to the technical characteristics of backscatter imaging that a collection time of the electrons and ion signals is less than tens of microseconds. Generally speaking, a drift velocity of the electrons is 1000 times of the drifty velocity of the ions, so that the drift velocity of the ions determines the collection speed of the entire signal. Even if only induced signals of the electrons may be collected, ion clouds formed by the ions that do not drift to the lower electrode may probably affect signal collection in the next cycle. The present disclosure further improves the drift velocity of the ions through the structures as shown in FIG. 2 to FIG. 4.

Referring to FIG. 2, in another embodiment of the present disclosure, the anode wire electrode layer 16 and the cathode electrode layer 15 are provided in multiple layers. The anode wire electrode layer 16 and the cathode electrode layer 15 are arranged at a distance and superimposed with each other, and all the anode wire electrode layers 16 are connected in parallel with each other, and all the cathode electrode layers 15 are connected in parallel with each other. The term "interactive superimposition" as mentioned herein refers to that the anode wire electrode layer 16 and the cathode electrode layer 15 are arranged in a repeated superimposed manner, that is the cathode electrode layer 15 is imposed with one layer of the anode wire electrode layer 16, further imposed with one layer of the cathode electrode layer 15, and further imposed with one layer of anode wire electrode layer 16. A distance between the anode wire electrode layer 16 and the cathode electrode layer 15 is approximately 1.7 cm, and are connected with each other via an insulating pillar 163. As a result, the detection efficiency may be improved, and this structure is extremely simple, and the voltage of each anode wire electrode layers 16 is lower and may be maintained in uniform. The detector of this embodiment may be conveniently operated in the proportional area, and the electrons may be amplified due to avalanche. Under the condition of low voltage, the anode wire may also work in the ionization chamber area, at the same time, the electrons are not amplified.

An arrow in FIG. 2 refers to an incident direction of the X-rays. As shown in FIG. 2, in this embodiment, the anode wire electrode layer 16 and the cathode electrode layer 15 are substantially perpendicular to the incident direction of the X-rays, that is to say, the anode wire electrode layer 16 and the cathode electrode layer 15 are arranged parallel with the direction of the entrance window 12.

Figure 3:
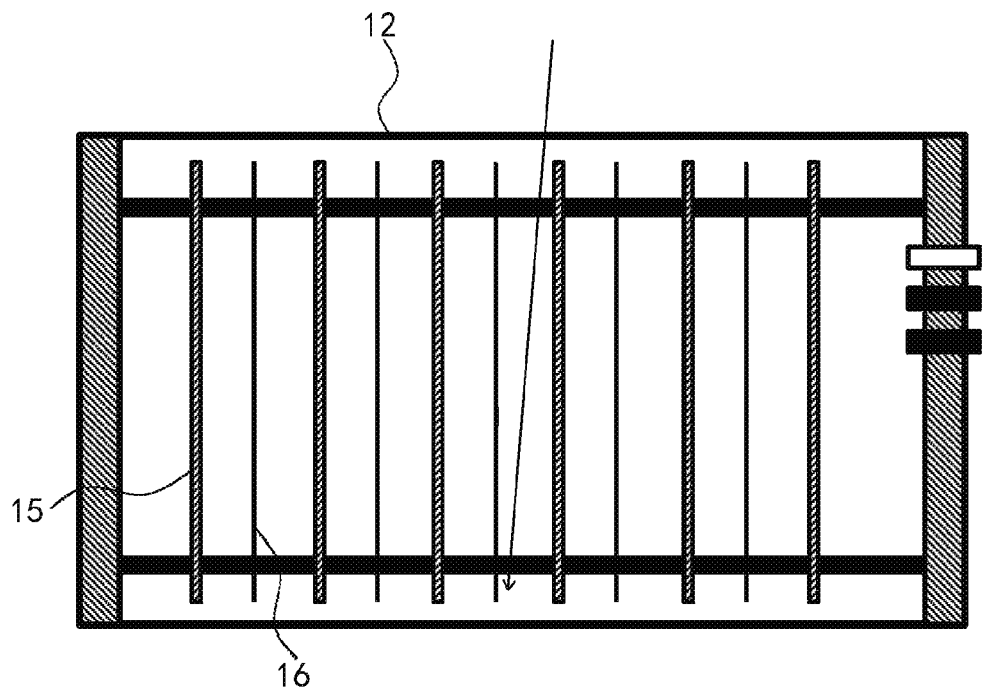
FIG. 3 is a schematic structural view of a large-area X-ray gas detector according to another embodiment of the present disclosure.
Figure 4:
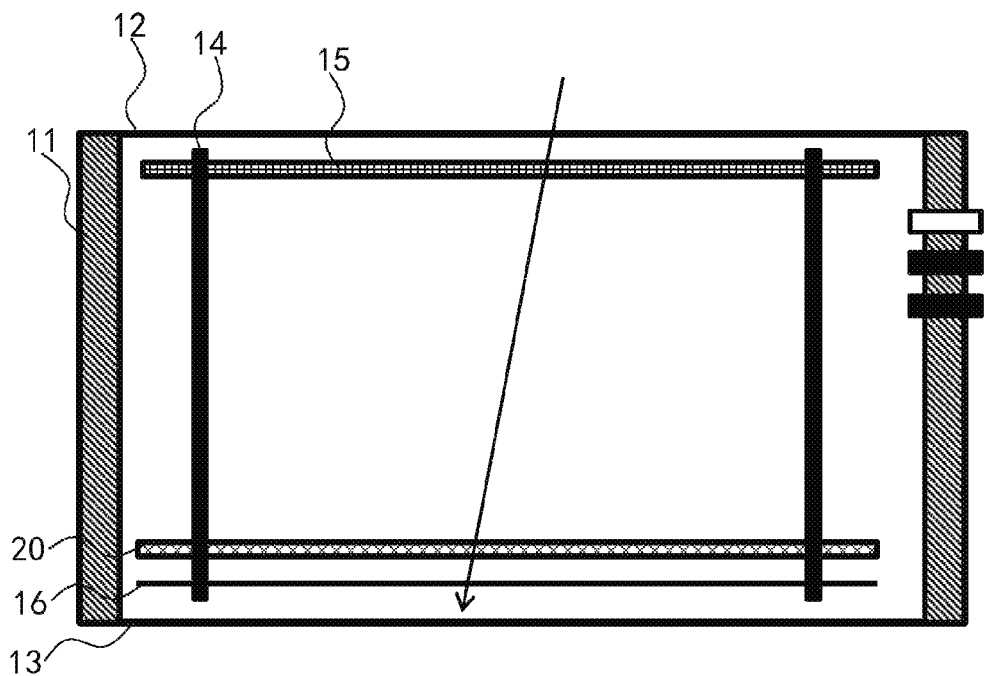
FIG. 4 is a schematic structural view of a large-area X-ray gas detector according to a third embodiment of the present disclosure.

Referring to FIG. 3, an arrow in FIG. 3 refers to an incident direction of the X-rays. In another embodiment of the present disclosure, the anode wire electrode layer 16 and the cathode residue electrode layer 15 are substantially parallel with the incidence direction of and the X-rays, that is to say, the anode wire electrode layer 16 and the cathode electrode layer 15 are arranged perpendicular to the direction of the entrance window 12. In addition, it is also possible to adjust each of the anode wire electrode layer 16 and cathode electrode layer 15 to be parallel with the incident direction according to a position of the X-ray emission initial point.

Referring to FIG. 4, in the third embodiment of the present disclosure, each of the anode wire electrode layer 16 and the cathode pixel electrode layer 15 is provided with one layer, and a screen gate electrode layer 20 is further provided between the anode wire electrode layer 16 and the cathode electrode layer 15. A voltage value of the screen gate electrode layer 20 is between voltage values of the anode wire electrode layer 16 and cathode electrode layer 15. The screen gate electrode layer 20 may include a metal wire mesh or a hollow metal plate, but not limited thereto. A region between the screen gate electrode layer 20 and the cathode electrode layer 15 is a drift region, and a region between the screen gate electrode layer 20 and the anode wire electrode layer 16 is an avalanche region. The electrons are not amplified in the drift region, but drift towards the screen gate electrode layer 20 under the action of the electric field formed at both ends thereof, wherein a large part of the electrons passes through the screen gate electrode layer 20, and then are amplified due to avalanche under a function of stronger electric field between the screen gate electrode layer 20 and the anode wire electrode layer 16. A large amount of electrons generated are led out by the anode wire electrode layer 16. Arrangement of the screen gate electrode layer 20 may facilitate rapid absorption of ions and greatly shorten drift time of the ions. At the same time, the detector works in the proportional area. If the voltage is decreased, the detector may also work in the ionization chamber area.

As shown in FIG. 1, a bottom plate 13 opposite to an entrance position of the ray entrance is also provided on the housing 11. The bottom plate 13 is detachably and hermetically connected to the housing 11, and encloses the inner cavity 110 together with the entrance window 12. The housing 11 may be opened from the other side of the entrance window 12 by providing the bottom plate 13 in order to repair the detector. In this way, it is not necessary to remove the entrance window frame 120 during maintenance. The bottom plate 13 may be a FR-4 circuit board of 3 mm and is hermetically connected to the housing by the structures such as the sealing ring.

In other embodiments of the present disclosure, both sides of the cathode electrode layer 15 may also be uniformly coated with a neutron-sensitive material, such as a $^{10}B$ simple substance, a compound, or a mixture thereof. The sensitive material has a layer thickness of 1 μm to 5 μm, such that the detector may be converted into a neutron and X-ray dual-sensitive detector, wherein a neutron detection sensitivity may theoretically reach a sensitivity level of a $^{3}He$ tube neutron detector module with a diameter of 5 cm, a length of 100 cm, and 1 atmospheric pressure. Thereby, the scope of using the detector may also be extended.

In summary, the large-area X-ray gas detector of the present disclosure has a larger receiving area and a faster charge collection velocity for the X-rays, and thereby increasing the total amount of the energy deposition of X-rays. The anode wire electrode layer 16 may collect the electrons in the inner cavity. The ions generated by the X-rays may be absorbed by the cathode electrode layer. The multi-layer electrode layers and the screen gate electrode layer are used to shorten the drift distance of the electrons and the ions, which improves the charge collection velocity of the detector, and have simple structure, are manufactured easily and have lower cost.

While the present disclosure has been described in detail in connection with the exemplary embodiments, it should be readily understood that the present disclosure is not limited to such disclosed embodiments. Rather, various alternations and equivalents of such metes and bounds are therefore intended to be embraced by the appended claims.

What is claimed is:

1. A large-area X-ray gas detector, comprising:
    a housing that has an inner cavity and a ray entrance communicated with the inner cavity, the inner cavity is filled with a working gas, and the working gas is a non-electronegativity gas sensitive to the X-ray;
    an entrance window of thin film type that is hermetically connected to the ray entrance such that the X-ray enters into the inner cavity; and
    a signal collection module comprising an anode wire electrode layer and a cathode electrode layer arranged parallel with each other in the inner cavity, in which the anode wire electrode layer has an anode wire for accessing to a high voltage, and the cathode electrode layer is grounded; and the anode wire electrode layer collects electrons generated by the working gas under an action of the X-ray,
    wherein the anode wire electrode layer further comprises an anode frame, and a plurality of insulating pillars are disposed on frame portions of opposite sides of the anode frame; the anode wire is serpentinely wrapped around the plurality of insulating pillars, and both ends of the anode wire are fixedly connected to the anode frame by a fixing assembly.

2. The large-area X-ray gas detector according to claim 1, wherein there are a plurality of anode wire electrode layers and a plurality of cathode electrode layers, the plurality of anode wire electrode layers and the plurality of cathode electrode layers are arranged at a distance and superimposed with each other, and the anode wire electrode layers are connected in parallel with each other, and the cathode electrode layers are connected in parallel with each other.

3. The large-area X-ray gas detector according to claim 2, wherein both sides of the cathode electrode layer are evenly coated with neutron-sensitive materials.

4. The large-area X-ray gas detector according to claim 1, wherein there is one anode wire electrode layer and one cathode electrode layer; a screen gate electrode layer is further provided between the anode wire electrode layer and the cathode electrode layer; a voltage value of the screen gate electrode layer is between a voltage value of the anode wire electrode layer and a voltage value of the cathode electrode layer.

5. The large-area X-ray gas detector according to claim 4, wherein the screen gate electrode layer comprises a metal wire mesh or a hollow metal plate.

6. The large-area X-ray gas detector according to claim 5, wherein both sides of the cathode electrode layer are evenly coated with neutron-sensitive materials.

7. The large-area X-ray gas detector according to claim 4, wherein both sides of the cathode electrode layer are evenly coated with neutron-sensitive materials.

8. The large-area X-ray gas detector according to claim 1, wherein the cathode electrode layer comprises an ultra-thin circuit board having a conductive layer on a surface of the ultra-thin circuit board.

9. The large-area X-ray gas detector according to claim 8, wherein the conductive layer is a "well"-shaped copper wire layer that completely covers front and back surfaces of the ultra-thin circuit board.

10. The large-area X-ray gas detector according to claim 9, wherein both sides of the cathode electrode layer are evenly coated with neutron-sensitive materials.

11. The large-area X-ray gas detector according to claim 8, wherein both sides of the cathode electrode layer are evenly coated with neutron-sensitive materials.

12. The large-area X-ray gas detector according to claim 1, wherein the cathode electrode layer comprises a metal wire mesh or a hollow metal plate.

13. The large-area X-ray gas detector according to claim 1, wherein the anode wire electrode layer and the cathode electrode layer are parallel with an incident direction of the X-ray.

14. The large-area X-ray gas detector according to claim 1, wherein the anode wire electrode layer and the cathode electrode layer are perpendicular to an incident direction of the X-ray.

15. The large-area X-ray gas detector according to claim 1, wherein the working gas is an inert gas, a polyatomic molecular gas, or a mixture of the inert gas and the polyatomic molecular gas.

16. The large-area X-ray gas detector according to claim 1, wherein the housing is further provided with a bottom plate opposite to an entrance position of the ray entrance, and the bottom plate is detachably and hermetically connected to the housing, and encloses the inner cavity together with the entrance window.

17. The large-area X-ray gas detector according to claim 1, wherein an air pressure of the working gas is greater than or equal to 1 atmospheric pressure.

18. The large-area X-ray gas detector according to claim 1, wherein the entrance window is one of a circuit board, a metal thin film structure, or a non-metal thin film structure.

19. The large-area X-ray gas detector according to claim 1, wherein both sides of the cathode electrode layer are evenly coated with neutron-sensitive materials.

* * * * *